Oct. 25, 1927.
O. SEVERSON
1,646,494
TOOL HOLDER WITH SIDE CLAMP
Filed Dec. 18, 1924
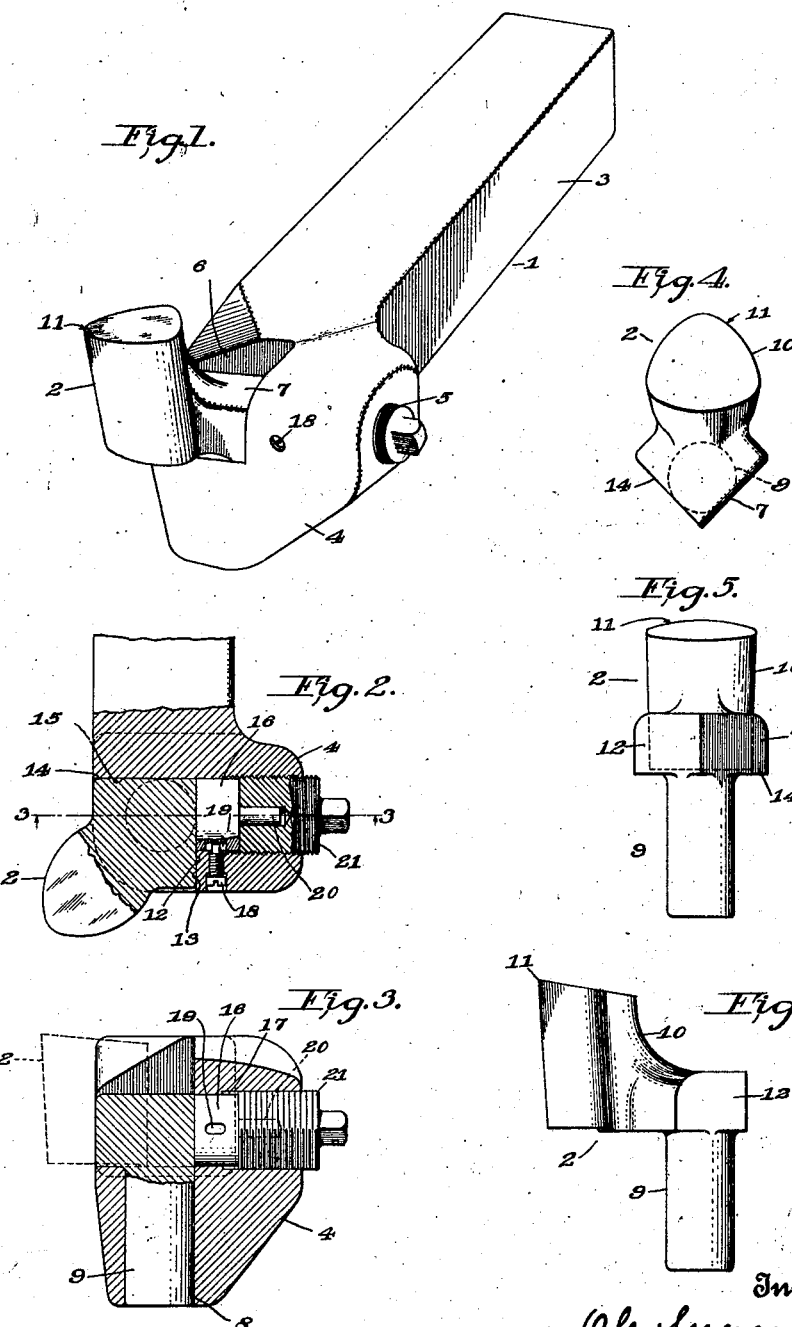
Inventor
Ole Severson
By Attorney
Albert F. Nathan Patented Oct. 25, 1927.

1,646,494

UNITED STATES PATENT OFFICE.

OLE SEVERSON, OF SHELTON, CONNECTICUT, ASSIGNOR TO THE O. K. TOOL COMPANY, INC., OF NEW YORK, N. Y., A CORPORATION OF NEW YORK.

TOOL HOLDER WITH SIDE CLAMP.

Application filed December 18, 1924. Serial No. 756,722.

My invention relates to cutting tools having detachable cutting members and particularly to the means for securely clamping the detachable cutting members in the holders.

One object of my invention is to provide a tool-holder having a detachable cutting member secured thereto in such a manner as not only to maintain the strength of the tool but also to reduce the distance between the support for the body portion of the holder and the point of support for the detachable cutting member on the holder.

Another object of my invention is to provide a tool-holder having a detachable cutting member that shall have the clamping mechanism mounted on the holder at the side of the cutting member and that shall operate the clamping mechanism from the side of the holder.

In lathe tools and in cutting tools for many machine tools, it is very desirable to provide a detachable cutting member which is inserted in a suitable holder. The cutting member is formed of suitable steel, which is adapted to withstand the cutting operation, and the holder portion, which is mounted in a suitable tool-support, is composed of any suitable material which will give the tool the required strength. It is necessary to clamp the cutting member to the holder in such manner as to insure against either a movement of rotation or a rectilinear movement of the cutting member with respect to the holder during a cutting operation.

In cutting tools of the type under consideration, the holder is supported in a tool-post at a point located as close as convenient to the end of the holder which carries the cutting member. The shorter the distance between the cutting edge and the point of support for the holder, the greater the strength and rigidity of the tool. Accordingly, the mechanism used to clamp the cutting member in the holder is located to the side of the cutting member. The so positioning of the clamping mechanism insures against a weakened neck portion on the holder between the cutting member and the point of support for the holder. Moreover, the so positioning of the clamping mechanism serves to shorten the distance between the cutting edge of the tool and the point at which the holder may be mounted on a tool support. It is also an important feature in a cutting tool constructed in accordance with my invention to have the clamping mechanism operated from the side of the tool-holder.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is an isometric view of a tool-holder having a side clamping mechanism and constructed in accordance with my invention. Fig. 2 is a plan view partially in section of the tool-holder shown in Fig. 1. Fig. 3 is a sectional view along the line 3—3 of Fig. 2. Fig. 4 is a plan view of a cutting member adapted to be inserted in the tool-holder. Figs. 5 and 6 are respectively end elevational and side elevational views of the cutting member shown in Fig. 4.

Referring to the drawings, a cutting tool is illustrated comprising a holder or body portion 1 in which is mounted a cutting member 2. The holder 1 comprises an elongated rectangular section 3 which may be secured in any suitable manner in a tool-support or post (not shown). An enlarged head portion 4 is formed on the holder for carrying not only the cutting member 2 but also for carrying the clamping mechanism 5 which serves for holding the cutting member securely in position. The holder 1 is preferably forged from material which will have sufficient strength to withstand the bending strains to which it is subjected during the cutting operation.

The head portions of the holder 1 is cut away at 6 for receiving a base portion 7 of the cutting member 2. A hole 8, which extends into the cut-away portion 6 is formed for receiving a stem or projection 9 on the cutting member 2. Preferably the projection 9 is closely fitted to the hole 8 in the head of the holder.

The cutting member 2 comprises the base portion 7, the stem or projecting portion 9 and a head portion 10 which carries a cutting edge 11. The base portion 7 rests upon the head of the holder and serves as a support for the cutting member. A side surface 12 on the base portion is formed flat in order to be engaged by the clamping mechanism 5 for holding the cutting member securely in position. The engagement of the clamping mechanism 5 with the flat surface 12 serves not only to hold the cutting member against any rectilinear movement in the tool-holder but also serves to prevent any rotative movement of the cutting member in the holder about the stem or projection 9 as a center.

Referring to Fig. 2 of the drawing, it will be noted that the flat surface 12 of the cutting member not only engages the clamping mechanism 5 but also engages a flat surface 13 on the tool-head 4. A second flat surface 14 is formed on the cutting member 2 in a plane substantially at right angles to the flat surface 12; such surface 14 preferably engages a flat surface 15 on the tool-head to assist in preventing any rotative movement of the cutting member in the tool-head during the cutting operation.

The clamping mechanism comprises a plunger 16 which is fitted to an orifice 17 formed in the side of the head 4. The plunger 16 engages the flat surface 12 on the cutting member 2 and is held in position by means of a set screw 18 which projects into a slot 19 formed in the plunger. The slot 19 is of sufficient length to permit a limited movement of the plunger with respect to the head. An integral projecting pin 20 on the plunger 16 extends into a clamping bolt 21. The clamping bolt 21 is threadably connected to the head 4 and serves to engage the plunger 16 for forcing it into engagement with the flat surface 12 on the cutting member.

In the above construction, it will be noted the clamping mechanism, which comprises the plunger 16 and the bolt 21, are entirely disposed to the side of the cutting member 2 and accordingly no opening is formed in the holder 3 between the point of support for the cutting member 2 and the point of support of the holder on the tool post. Moreover, attention is called to the fact that the clamping mechanism is operated solely from the side of the holder. Although only a left hand tool holder is shown on the drawing, it is to be understood my invention is equally applicable to tool holders of either hand.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. A cutting tool, comprising a holder for mounting in a support, a detachable cutting member mounted in one end of said holder, a plunger movable horizontal and transversely with respect to the holder for engaging a side of said cutting member, said side extending longitudinally of said holder, said plunger having a limited movement in said holder, and a screw-member secured to the holder and engaging the plunger for forcing it into clamping engagement with the cutting member to hold it securely in position and to prevent any rotative or rectilinear movement thereby.

2. A cutting tool, comprising a holder for mounting in a support, a detachable cutting member mounted in one end of said holder, a plunger for engaging the side of said cutting member, a pin projecting through a portion of the holder and so fitted to a groove in the plunger as to permit a limited movement of the plunger in a lateral direction with respect to the holder, and a screw member secured to the holder and engaging the plunger for forcing it into clamping engagement with the cutting member.

3. A cutting tool, comprising a holder for mounting in a support having an opening formed in said holder near one end thereof, a plunger mounted in the side of the holder, and a screw member secured to the side of the holder and engaging said plunger for forcing it into clamping engagement with the side of a cutting member adapted to be inserted in said opening, said side extending substantially longitudinally of said holder.

4. A cutting tool, comprising a holder for mounting in a support having a hole formed in said holder near one end thereof, a plunger mounted in the holder and adapted to be moved laterally of said holder and substantially at right angles to said hole, a pin projecting through a portion of the holder and so fitted to a groove in the plunger as to permit a limited movement of the plunger in said lateral direction, and a screw member secured to the side of the holder and engaging said plunger for forcing it into clamping engagement with the side of a cutting member adapted to be inserted in said hole.

5. A cutting tool, comprising a holder for mounting in a support, a detachable cutting member having a stem portion fitted to a hole formed in the holder and a flat surface formed above the stem portion; a plunger mounted in the holder so as to have a limited lateral movement transversely with respect to the holder and with respect to said stem portion and engaging the flat surface on the side of the cutting member, and a screw member mounted in the side of the holder for forcing the plunger into engagement with the cutting member, said plunger and screw member being operated from the side of the holder.

6. A cutting tool, comprising a holder for mounting in a support having an opening formed in said holder near one end thereof; a cutting member having a portion thereof inserted in said opening, said cutting member having two adjoining flat surfaces arranged at an angle to each other and positioned adjacent to similar surfaces on the holder; a plunger mounted in the side of the holder; and means for moving the plunger laterally with respect to the holder for engaging one of the flat surfaces on the cutting member to clamp the member in position.

7. In a cutting tool, a holder having an opening in the outer end thereof and adjoining bearing surfaces arranged at an angle to each other; a cutting member mounted in said opening and having surfaces adapted to engage said adjoining surfaces on said holder; a plunger mounted in an opening in the side of said holder and adapted to engage a longitudinally extending surface of said cutting member; and means for moving said plunger transversely of the holder to cause such engagement.

In witness whereof, I have hereunto subscribed my name.

OLE SEVERSON.